United States Patent [19]

Ramsden

[11] 4,220,139

[45] Sep. 2, 1980

[54] SOLAR PANEL SHIELDING

[76] Inventor: James B. Ramsden, Unit 85, 655 Walkley Rd., Ottawa, Ontario, Canada, K1V 9P1

[21] Appl. No.: 942,672

[22] Filed: Sep. 15, 1978

[51] Int. Cl.² .............................................. F24J 3/02
[52] U.S. Cl. .................................... 126/441; 126/419; 126/422
[58] Field of Search ............... 126/270, 271, 441, 418, 126/422, 447, 419

[56] References Cited

U.S. PATENT DOCUMENTS

| | | | |
|---|---|---|---|
| 2,030,350 | 2/1936 | Bremser | 126/271 |
| 3,822,692 | 7/1974 | Demarest | 126/271 |
| 4,019,496 | 4/1977 | Cummings | 126/271 |
| 4,064,867 | 12/1977 | Schlesinger | 126/271 |
| 4,078,544 | 3/1978 | Hollands et al. | 126/271 |
| 4,112,918 | 9/1978 | Palkes | 126/442 X |
| 4,144,931 | 3/1979 | Medico, Jr. | 126/441 |

Primary Examiner—Carroll B. Dority, Jr.
Assistant Examiner—Larry Jones
Attorney, Agent, or Firm—Wenderoth, Lind & Ponack

[57] ABSTRACT

A solar energy collector is disclosed. The collector has a frame, a window and an absorber enclosed by the frame and a combined heat trapping and heat shielding arrangement between the window and the absorber. The trapping and shielding arrangement consists of a series of vanes extending from side to side of the frame and, in a heat trapping position, from the window to the absorber. In a heat shielding position, the vanes overlap when projected upon the plane of the absorber so that incident radiation must pass through plural vanes before reaching the absorber.

10 Claims, 10 Drawing Figures

SOLAR PANEL SHIELDING

FIELD OF THE INVENTION

The present invention relates to solar heat collectors.

BACKGROUND OF THE INVENTION

In the field of solar heat collection, much attention has been paid to the improvement of collector efficiency, through increasing the proportion of incident energy collected and decreasing the thermal energy losses from the collector. It has been found, however, that with highly efficient collectors operating under less than full demand, the temperature of the collector can rise to undesirable levels. This problem has been dealt with in the past through the use of auxiliary cooling circuits tapping hot fluid from the collector and passing it through a heat exchanger to reject heat to the atmosphere.

The present invention is concerned with another solution to this problem.

SUMMARY OF THE INVENTION

According to the present invention there is provided a solar energy collector comprising: a frame; a window transmissive to solar energy mounted in the frame; a solar energy absorber mounted in the frame at a position spaced from the window, to receive solar energy transmitted through the window; a plurality of vane elements extending across the frame between the window and the absorber, each element being substantially transmissive to solar energy and substantially absorptive of thermal energy; and means for moving the vane elements between a heat trapping position in which each vane element extends substantially between the window and the absorber, and a shielding position in which the vane elements overlap when projected upon the plane of the absorber and the window such that solar energy transmitted through the window must pass through plural vanes to reach the absorber.

Thus, the present invention uses the vane elements that are used in some known collectors as heat traps for an additional shielding function, screening out sufficient of the incoming solar radiation to obviate the overheating problem.

The vanes may be flat and arranged either parallel or with alternate vanes sloping in opposite directions to provide V-shaped channels extending across the collector in the trapping position.

Alternatively, the vanes may be V-shaped in section to provide a series of V-shaped channels in the trapping position.

The vanes are preferably pivotably mounted in the frame for movement about parallel axes. A vane moving mechanism may be responsive to the temperature of the collector so that the shielding position is adopted automatically when needed.

BRIEF DESCRIPTION OF THE DRAWINGS

In the accompanying drawings which illustrate exemplary embodiments of the present invention.

DETAILED DESCRIPTION OF EXEMPLARY EMBODIMENTS

Figure 1:
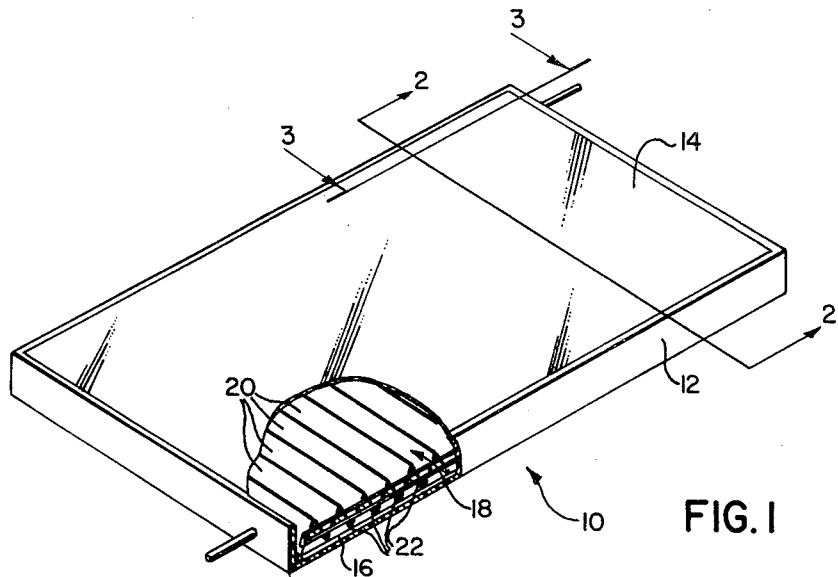
FIG. 1 is a perspective view of a solar energy collector, with a broken out section to illustrate the internal construction.

Referring to the drawings and more particularly to FIGS. 1 to 4, the solar energy collector 10 illustrated in those drawings has a peripheral insulated frame 12, a window 14 transmissive to solar radiation mounted in the frame and an absorber 16 mounted in the frame at a position spaced from the window. Between the window and the absorber is a heat trap 18 consisting of a series of oppositely sloping vanes 20 and 22 defining a series of V-shaped channels extending from side to side across the frame and from the window 14 to the absorber 16, with adjacent channels opening in opposite directions. The vanes 20 and 22 are made of a plastic material substantially transmissive to solar radiation and substantially absorptive of thermal radiation that may be emitted by the absorber 16.

As thus far described, the structure is generally similar to that known from U.S. Pat. No. 4,019,496 issued Apr. 26, 1977 to Richard Daniel Cummings, which is hereby incorporated by reference. As described in that patent, the maximum width W of the V-shaped channels should be less than ⅜ inch to prevent natural convection cells from developing, while the depth D of the channels should be between 3 and 20 times, preferably at least 10 times the width of a channel to suppress re-radiation through window 14.

Figure 2:
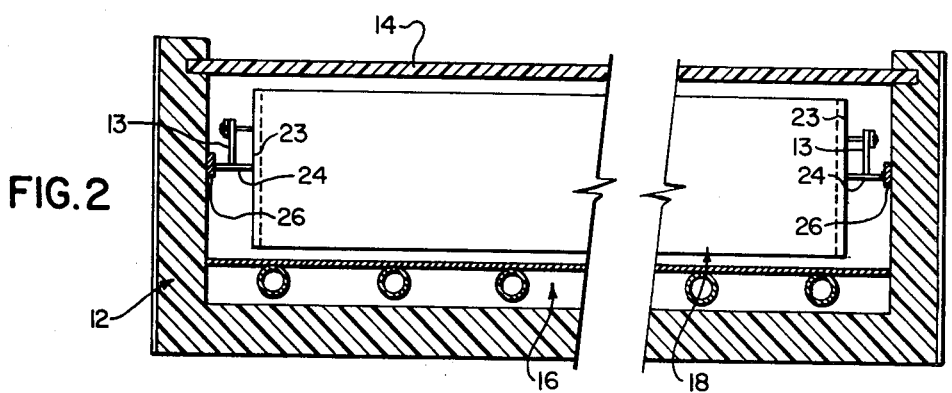
FIG. 2 is a view along line 2—2 of FIG. 1.
Figure 3:
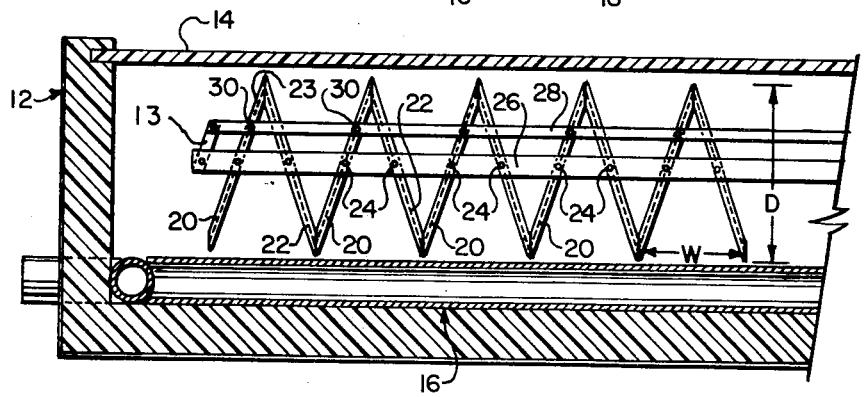
FIG. 3 is a view along line 3—3 of FIG. 1.
Figure 4:
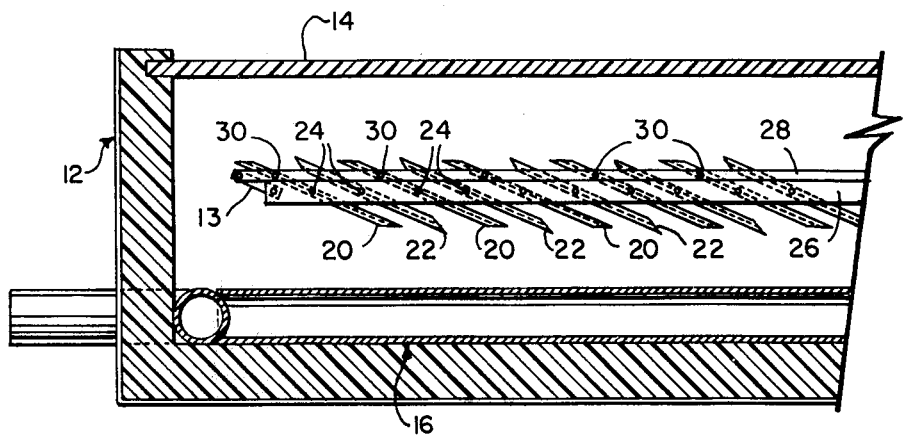
FIG. 4 is a view like FIG. 3, showing the vanes in their shielding positions.

As illustrated most particularly in FIGS. 2, 3 and 4, the vanes 20 and 22 of the present heat trap are independent elements, adjacent ones of which abut one another along their side edges. The vanes have reinforcing strips 23 along their end edges.

Each of the vanes 20 and 22 has a stud shaft 24 projecting from each of its end strips 23, along the center line of the vane. The shafts are journalled to respective bars 26 extending along and mounted on the inner side faces of frame 12. This permits the vanes 20 and 22 to pivot about respective parallel axes. To provide for such pivotting motion, a link 28 extends along each side of the frame and is pinned to the end strip 23 of each vane 20 by a pin 30. The links 28 are connected at their ends to the adjacent bars 26 by links 13 pivotally connected both to the link and to the bar. This linkage permits the re-orientation of the vanes into a shielding position as illustrated in FIG. 4. As will be apparent from a comparison of FIGS. 3 and 4, this is accomplished by movement of the links 28 to the left as seen in those figures to pivot the vanes 20 counter-clockwise. With continued movement, the vanes 20 come into engagement with the vanes 22 and pivot them counter-clockwise as well until the vane assembly reaches the position shown in FIG. 4. In this position the vanes 20 and 22 overlap when projected upon the plane of the absorber 16.

With the vanes in the position shown in FIG. 4, incident solar radiation intercepts the vanes at a fairly large angle and must pass through a number of the vanes before reaching the absorber 16. A major portion of the radiation incident on a vane will pass through the vane and a minor portion will be reflected away from the absorber. Because the incoming radiation must pass through several overlapped vanes, with reflection from each vane, there is a significant reduction in the intensity of the radiation reaching the absorber.

The reflected portions of the radiation are reflected away from the absorber and may intercept an upper overlapping vane. Again, a major portion of the radiation will be transmitted through the vane and a minor portion reflected back towards the absorber and so on. The result is that by far the major portion of the reflected radiation is ultimately reflected away from the absorber and the amount of radiation reaching the absorber is significantly reduced.

In addition to decreasing the amount of solar radiation actually reaching the absorber, the re-orientation of the vanes alters their collective geometry such that natural convection cells are generated at the face of the absorber, increasing the thermal losses from it.

Figure 5:
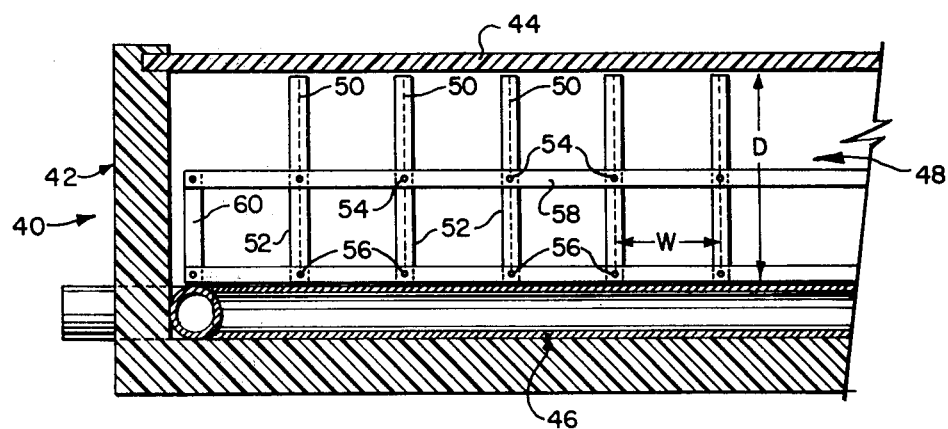
FIGS. 5 and 6 are views like FIGS. 3 and 4 showing another embodiment of collector.
Figure 6:
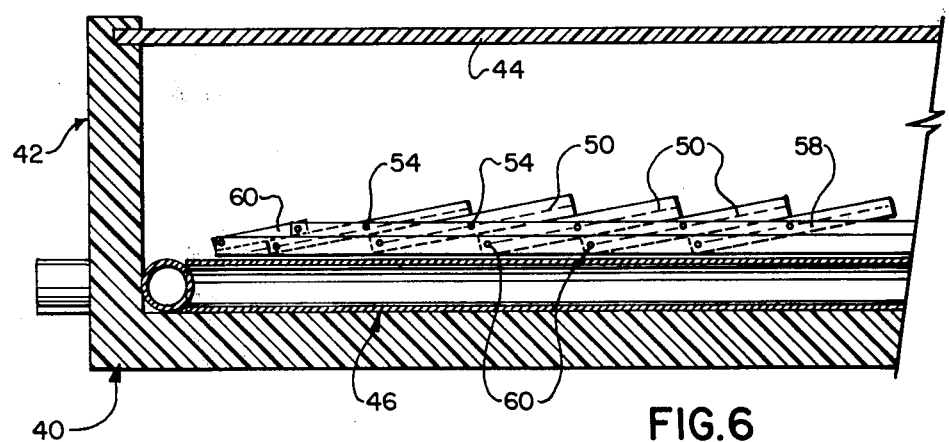

Turning now to FIGS. 5 and 6, there is illustrated a solar energy collector 40 having an insulated frame 42, a window 44 and an absorber 46 similar to the corresponding elements of FIGS. 1 to 4. The collector 40 also includes a heat trap 48 consisting of a series of parallel vanes 50 extending from side to side across the frame between the window 44 and the absorber 46. Each vane 50 is made of a solar radiation transmitting and thermal radiation absorbing material.

Reinforcing strips 52 are fitted on the end edges of each vane 50. The strips 52 are pinned to bars 54 extending along opposite sides of the frame, just above the absorber 46, for rotation about parallel axes 56. A link 58 extends along each side of the frame, above bar 54 and is pinned to each of the vanes 50 at the midpoint of the vane. Each link 58 has its opposite ends connected to a respective one of bars 54 by links 60.

As illustrated in FIG. 5, the vanes 50 are, in their heat trapping position, parallel to one another and perpendicular to the absorber 46. The height D of each vane 50 is about ten times the vane spacing W. The function of the vanes as a heat trap is generally similar to that of the embodiment of FIGS. 1 to 4, although any thermal energy radiated from the absorber will be more likely to escape through the window.

Referring to FIG. 6, the collector 40 is illustrated with its heat trap 48 in its shielding position. To reach this position, the link 58 is moved to the right and the vanes 50 consequently pivotted to the right about their axes 56 until they overlap when projected upon the plane of the absorber. The function of the vanes 50 in their heat shielding position is like that of vanes 20 and 22 of the embodiment illustrated in FIGS. 1, 2 and 4, although convection cells are not generated at the face of the absorber.

Figure 7:
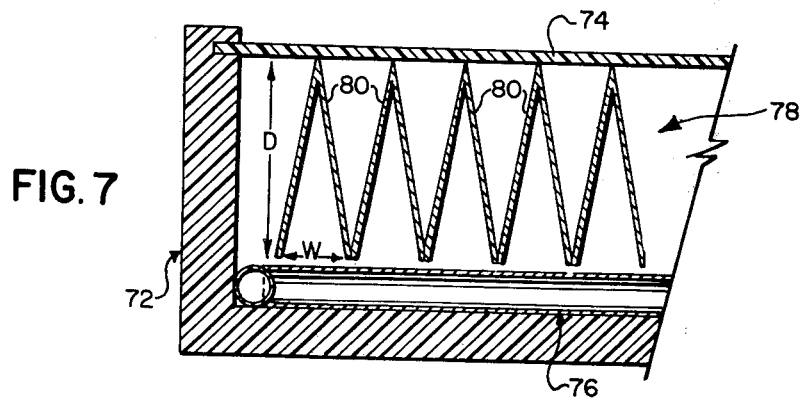
FIGS. 7 and 8 are views like FIGS. 3 and 4 showing still another embodiment of collector.
Figure 8:
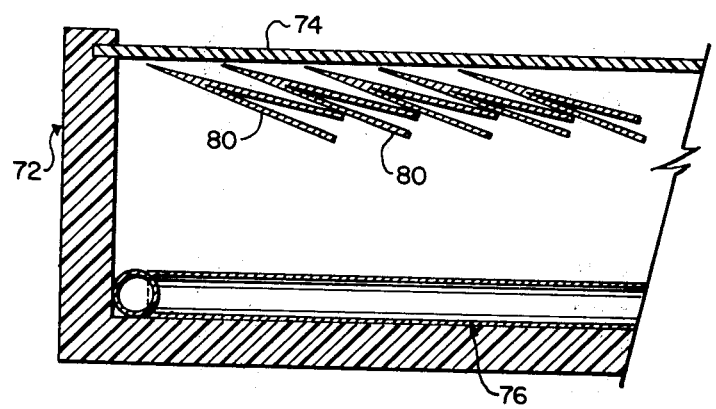

Another embodiment of collector is illustrated in FIGS. 7 and 8. The collector 70 illustrated in those figures has an insulated frame 72, a window 74 and an absorber 76 analogous to those of the preceding embodiments. The heat trap 78 consists of vanes 80 of inverted V-shaped cross-section. The vanes are made of a solar radiation transmitting and thermal radiation absorbing material. Vanes 80 are mounted on the frame 72 for rotation about parallel axes adjacent their apices. A mechanism analogous to that incorporated in the preceding embodiments is included for pivoting the vanes about these axes. The vanes in this embodiment are relatively stiff because of their V-shape so that no reinforcement is needed at their end edges.

In their heat trapping position, the vanes extend from side to side across the frame and from the window to the absorber with adjacent free edges of the vanes abutting one another so as to provide a series of V-shaped channels extending across the frame and opening alternately towards the window and the absorber. The depth D of each channel is approximately ten times its maximum width W. The function of the vanes as a heat trap is analogous to the function of the vanes 20 and 22 of FIGS. 1 to 4.

Referring to FIG. 8, the vanes 80 are shown pivoted about their axes to their heat shielding position where the vanes overlap when projected upon the plane of the absorber 76, so that solar radiation passing through window 74 must pass through a number of vanes 80 before it reaches the absorber. As previously discussed with respect to the embodiment of FIGS. 1 to 4, the vanes reflect a significant quantity of the radiation and no longer inhibit convection losses. In this embodiment the vane material is sufficiently flexible to permit some collapse of the channels in the heat shielding position.

Figure 9:
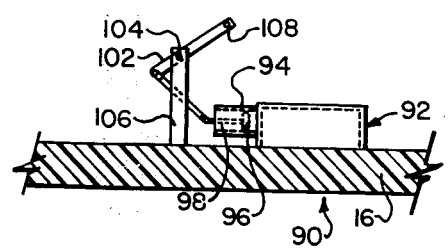
FIGS. 9 and 10 illustrate in side and end views respectively a vane operating mechanism.
Figure 10:
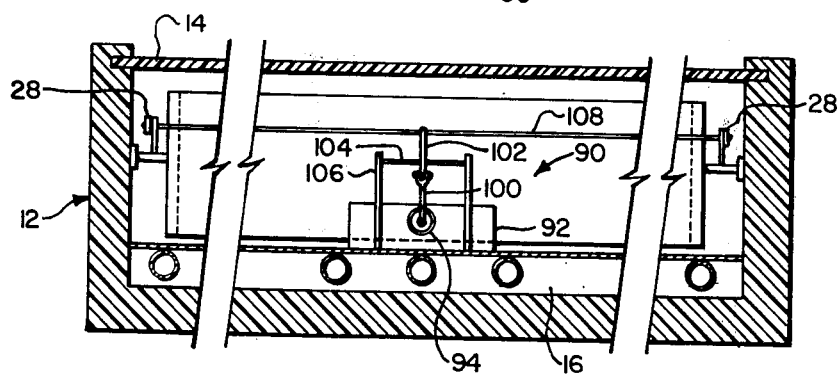

FIGS. 9 and 10 of the accompanying drawings illustrate a thermally sensitive operator 90 associated with the collector of FIGS. 1 to 4 for moving the vanes 20 and 22 between their heat trapping and heat shielding positions. The operator consists of a chamber 92 mounted directly on the top face of the absorber 16. The chamber 92 is filled with a fluid with a relatively large co-efficient of thermal expansion in the operative temprature range of the collector. A cylinder 94 is connected to the chamber 92, in communication with its interior, and is fitted with a piston 96 with a piston rod 98 projecting from the end of the cylinder. Piston rod 98 is coupled, via connecting rod 100 to a rocker arm 102 mounted on a horizontal shaft 104 supported by two standards 106. The rocket arm 102 is connected to a rod 108 extending across the collector and coupled to the links 28 to shift them back and forth between the positions illustrated in FIGS. 3 and 4.

In operation, as the temperature of the absorber 16 increases, the fluid in chamber 92 expands and drives piston 96 outwardly, rocking rocker arm 102 via piston rod 98 and connecting rod 100. Rocker arm 102 acts through rod 108 to move the links 28 from the position shown in FIG. 3 to the position shown in FIG. 4.

Conversely, when the temperature of absorber 16 drops, the fluid in chamber 92 contracts, the piston 96 is drawn into its cylinder 94 to move the rocker arm 102 in the opposite direction via connecting rod 100 and piston rod 98 until the vanes resume their heat trapping positions illustrated in FIG. 3.

If it is desired, the operator may be provided with a thermally sensitive latch mechanism formed, for example, of a bimetallic element so that movement of the vanes from one position to another occurs only above and below certain limiting temperatures.

While the foregoing embodiments have been described as having a channel height D to width W ratio of about ten, this ratio may be within the range from three to twenty or an even wider range, and still provide useful results.

Similarly, the number of vane overlaps normal to the absorber will be variable within wide limits, for example from two to twenty overlaps.

What I claim as my invention is:
1. A solar energy collector comprising:
   a frame;

a window transmissive to solar energy mounted in the frame;

a solar energy absorber mounted in the frame at a position spaced from the window; to receive solar energy transmitted through the window;

a plurality of vane elements extending across the frame between the window and the absorber, each element being substantially transmissive to solar energy and substantially absorptive of thermal energy; and means for moving the vane elements between a heat trapping position in which each vane element extends substantially from the window to the absorber, and a shielding position in which the vane elements overlap when projected upon the plane of the absorber and the window, the major axis of said vane elements being substantially parallel in both the heat trapping and heat shielding positions such that substantially all of the solar energy transmitted through the window must pass through plural vane elements to reach the absorber, thereby the amount of radiation reaching the absorber is significantly reduced.

2. A collector according to claim 1 wherein each vane element is substantially flat.

3. A collector according to claim 2 wherein the vane elements are pivotally mounted in said frame for movement about parallel axes.

4. A collector according to claim 3 wherein the axes are adjacent the absorber.

5. A collector according to claim 1 wherein each vane element is substantially V-shaped in cross-section.

6. A collector according to claim 5 wherein the adjacent V-shaped vane elements engage one another along their adjacent edges when the vane elements are in their heat trapping positions.

7. A collector according to claim 1 including means responsive to the temperature of the collector for moving the vane elements between their heat trapping and shielding positions.

8. A collector according to claim 1 wherein, in the heat shielding position of the vane elements, solar energy must pass through between two and twenty vanes to reach the absorber.

9. A solar energy collector comprising:

a frame;

a window transmissive to solar energy mounted in the frame;

a solar energy absorber mounted in the frame at a position spaced from the window, to receive solar energy transmitted through the window;

a plurality of substantially flat vane elements extending across the frame between the window and the absorber, each element being substantially transmissive to solar energy and substantially absorptive of thermal energy; and means for moving the vane elements between a heat trapping position in which each vane element extends substantially from the window to the absorber and engages the adjacent vane elements along its respective edges to define a pair of oppositely opening, substantially V-shaped channels extending across the frame, and a shielding position in which the vane elements overlap when projected upon the plane of the absorber and the window such that solar energy transmitted through the window must pass through plural vane elements to reach the absorber, thereby the amount of radiation reaching the absorber is significantly reduced.

10. A collector according to claim 9 wherein the vane elements are pivotable about parallel axes along their respective center lines.

* * * * *